Figure 1:
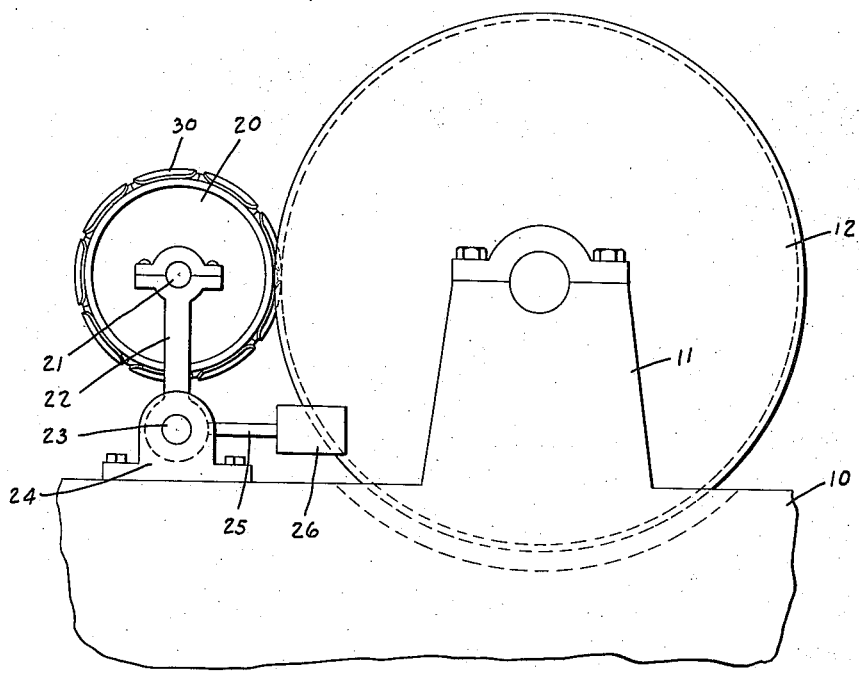

L. W. BUGBEE.
TORIC LENS SERIES AND PROCESS OF MAKING SAME.
APPLICATION FILED NOV. 12, 1920.

1,426,146.

Patented Aug. 15, 1922.
4 SHEETS—SHEET 1.

INVENTOR.
LUCIAN W. BUGBEE.
BY
ATTORNEYS.

L. W. BUGBEE.
TORIC LENS SERIES AND PROCESS OF MAKING SAME.
APPLICATION FILED NOV. 12, 1920.
1,426,146.
Patented Aug. 15, 1922.
4 SHEETS—SHEET 2.
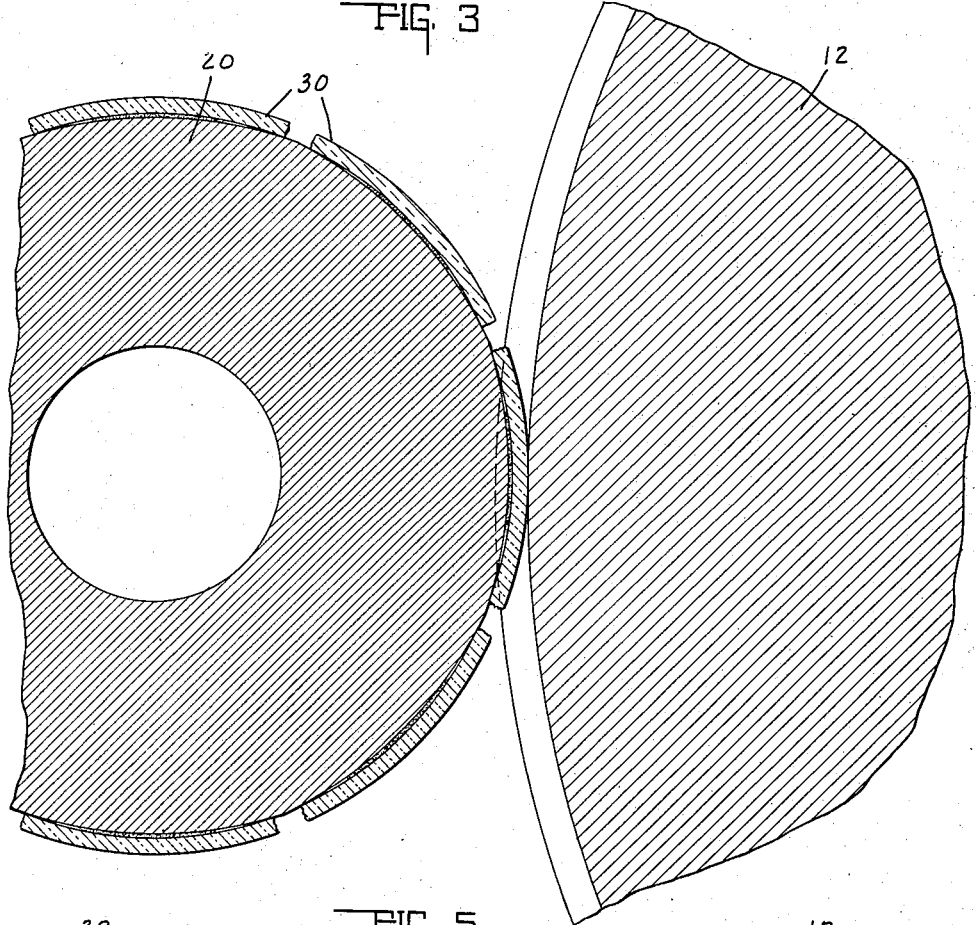
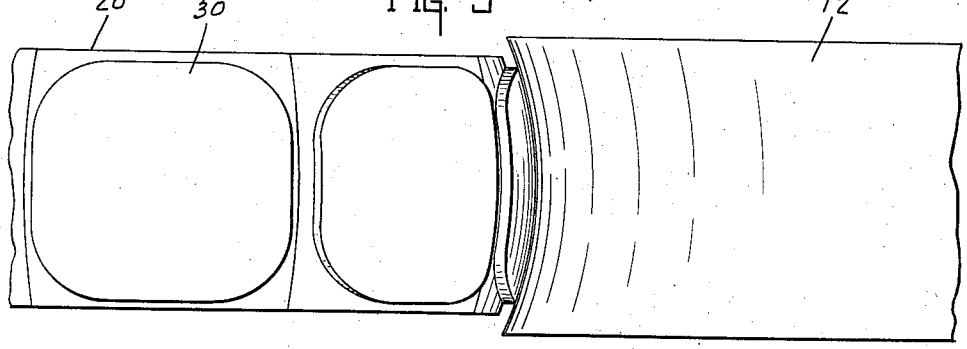
INVENTOR.
LUCIAN W. BUGBEE.
BY
ATTORNEYS.

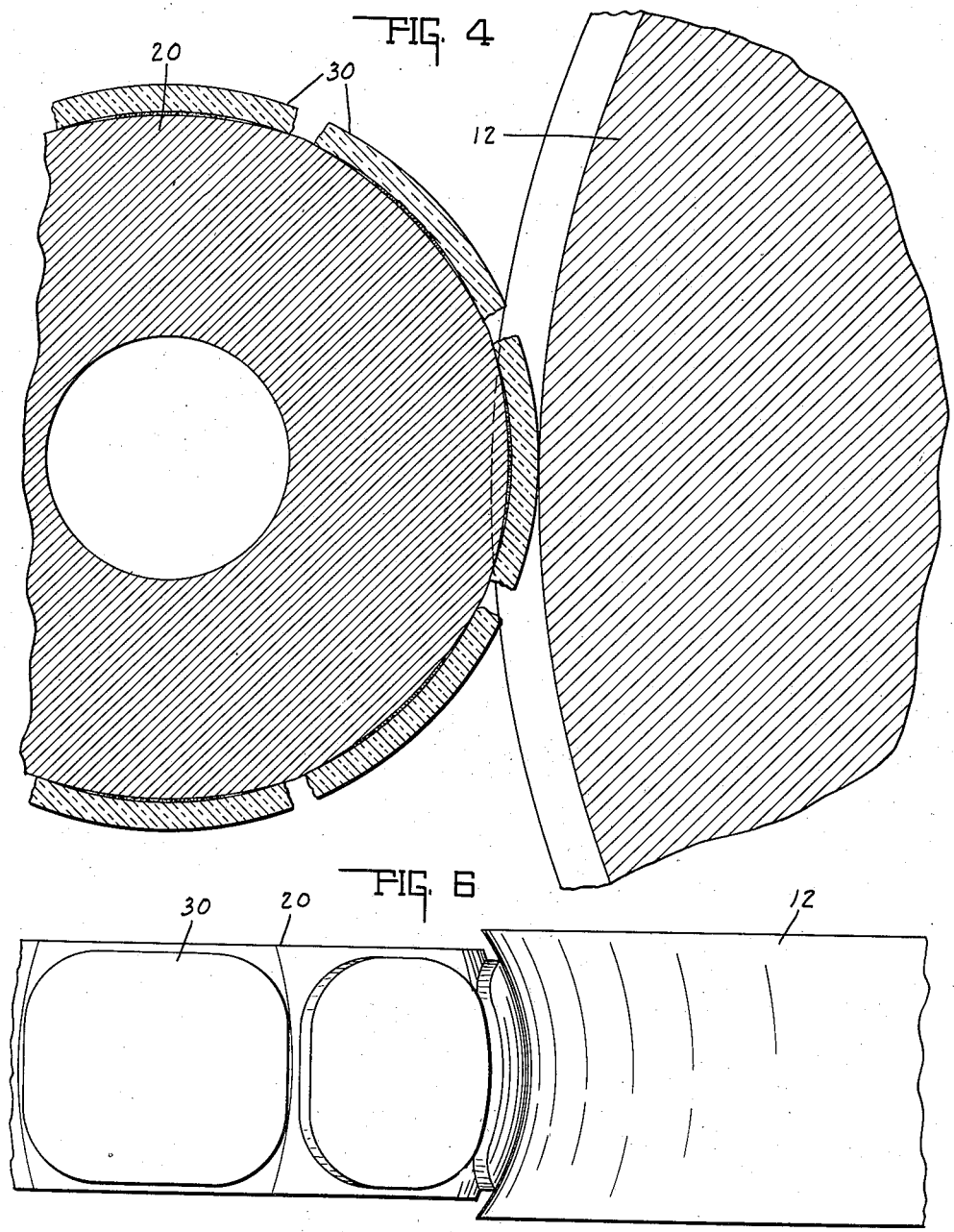

L. W. BUGBEE.
TORIC LENS SERIES AND PROCESS OF MAKING SAME.
APPLICATION FILED NOV. 12, 1920.
1,426,146.
Patented Aug. 15, 1922.
4 SHEETS—SHEET 4.
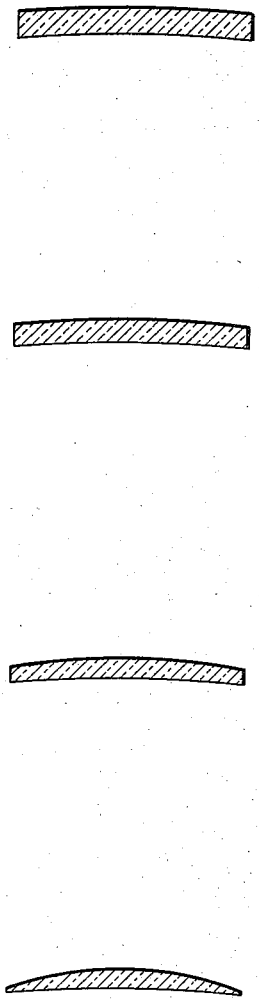
FIG. 7
INVENTOR.
LUCIAN W. BUGBEE.
BY
ATTORNEYS.

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

TORIC-LENS SERIES AND PROCESS OF MAKING SAME.

1,426,146. Specification of Letters Patent. Patented Aug. 15, 1922.

Application filed November 12, 1920. Serial No. 423,669.

*To all whom it may concern:*

Be it known that I, LUCIAN W. BUGBEE, a citizen of the United States, and a resident of Indianapolis, county of Marion, and State of Indiana, have invented a certain new and useful Toric-Lens Series and Process of Making Same; and I do hereby declare that the following is a full, clear, and exact description thereof, reference being had to the accompanying drawings, in which like numerals refer to like parts.

This invention relates to a series of ophthalmic lenses of toric type having a constant base curve on the concave sides thereof and the convex surfaces thereof being toric with their curvatures in one principal meridian, called herein the equatorial curvature, varying according to the thickness of the lenses so that the lenses of the series will have substantially the same power, and to the process of making the same. By "substantially the same power" is meant the same power within reasonable commercial limits.

The above is a statement of the generic vention, but a specific invention, that particularly shown and described herein, relates to such a series of toric lenses having substantially the same power but with varying curvatures in the other principal meridian, termed herein the meridional curvature.

The process of making said toric lens series, broadly stated, consists first in forming on the concave sides of said lenses a uniform base curvature, say of six dioptrics, and afterwards grinding and finishing the convex surfaces in toric form, and particularly by mounting the lens blanks of the series with the concave sides secured upon the periphery of spotting wheels of uniform diameter and grinding the toric surfaces with grinding tools or stones for giving to the same the desired meridional curvature in one principal meridian, while the varying thicknesses of the blanks or lenses mounted on said spotting wheel produce the desired equatorial curvatures in the other principal meridian. Thus where a series of grinding tools or stones are used having varying meridional curvatures in one principal meridian, varying thicknesses of the lenses will result and that will determine the equatorial curvatures in the other principal meridian of the series of lenses.

To express the novel feature of the series of lenses in another way, the equatorial curvatures in one principal meridian are determined by and, therefore, depend upon the thickness of the lenses, and the thickness of the lenses will be determined by the meridional curvature in the other principal meridian. Their meridional curvature is sometimes called the "cylinder" and the equatorial curvature is sometimes called the "sphere." Varying cylinders or cylindrical curvatures, when such process is employed, varies the thickness of the lenses, and the thickness of the lenses varies the spheres or spherical curvatures, and the lenses have practically the same power throughout their entire area.

The series of toric lenses constituting this invention are relatively more nearly perfect than toric lenses made by processes heretofore employed. Reference may briefly be made to the three types of toric lenses resulting from three processes heretofore used in the art. One may be called the prevailing type of toric lens, the process of which is familiar to all skilled in the art of making ophthalmic lenses. These lenses can only be made right for one thickness of lens and they become less nearly perfect as the thickness of the lens increases. The power of the prevailing type of toric lens, when the wearer looks other than radially through them, is very different from the original prescription for reasons known to those skilled in the art and which need not here be stated.

Another type of toric lens is the onepiece bifocal lens, called in the trade "Ultex" lens, as represented by the distance portion thereof. In this type of toric lens the deep curve effect is preserved and its power is more nearly uniform regardless of the angle at which one looks, than in the prevailing type of toric lenses.

Still a third type of toric lenses is what is called in the trade the "Punktal" lens, where each curve in the toric is calculated for an individual prescription, but in the manufacture of these lenses a tool for each prescription is required and they must be made one at a time, so that they cannot be made in a large way like the prevailing type of toric lens.

The new toric lens constituting this present invention has practically all of the advantages of all three of the toric lenses above described. It can be made commercially in large quantities as well and as cheaply as the prevailing type of toric lenses and at the same time it preserves the deep curve effect of the distance portion of the Ultex onepiece bifocal lens, and it is practically as good theoretically as the "Punktal" lens.

The means for carrying out said process is substantially the same as set forth in my former applications Serial No. 275,789, filed February 8, 1919, for spotting wheel for making toric lenses, and Serial No. 276,190, filed February 10, 1919, for process of making toric lenses.

Figure 2:
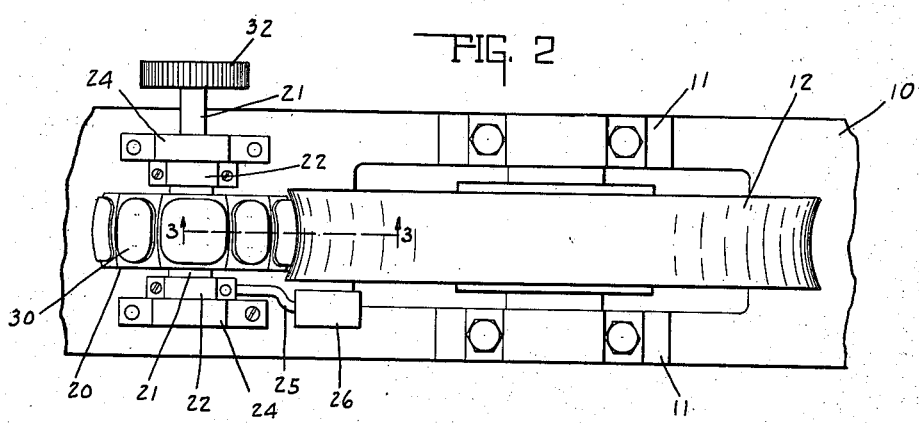

The full nature of the invention will be understood from the accompanying drawings and the following description and claims:

In the drawings, Fig. 1 is a side elevation of means which may be employed for carrying out the process herein set forth and for making the series of toric lenses constituting this invention, the lower parts of the machine being broken away. Fig. 2 is a plan view of Fig. 1. Fig. 3 is a vertical section of a portion of Fig. 1 on the line 3—3 and on an enlarged scale. Fig. 4 is a similar section with thicker lens blanks or lenses on a spotting wheel of the same diameter as in Fig. 3, but with a grinding wheel of sharper transverse curvature. Fig. 5 is a plan view of a portion of Fig. 2 on a larger scale. Fig. 6 is a similar view with thicker lenses or blanks and a grinding wheel with a sharper transverse curvature. Fig. 7 illustrates sections through the series of toric lenses made according to the process set forth herein, the upper row showing the "spheres" or equatorial curvatures and the lower row showing the "cylinders" or meridional curvatures of the same lenses.

In the drawings, 10 is the table of a machine with an oppositely located pair of posts 11 in which a grind stone 12 or other suitable grinder for ophthalmic lenses is mounted so as to rotate. The periphery of the grind stone has a concave transverse curvature adapted to grind the lenses so as to give to them the predetermined cylinder or meridional curvature. The means for rotating the grinder 12 is not shown, as mechanism for rotating the same is well known in the art.

A spotting wheel 20 is mounted on an arbor 21 carried by a pair of supports 22 pivoted at their lower ends on a pivot shaft 23 in the bearing blocks 24 secured to the table 10 adjacent the periphery of the grind stone. A weighted arm 25 is rigidly connected with the pivot shaft 23 and extends towards the grind stone and has a weight 26 on its outer end. The weighted arm yieldingly forces the spotting wheel towards and in engagement with the periphery of the grind stone, and said grind stone and spotting wheel are tangential of each other, as is more fully presented and explained in my former application Serial No. 276,539, filed February 12, 1919, for lens grinding machine.

The spotting wheel is made of metal and rectangular seats are cut in the periphery of the wheel to receive the lens blanks 30 thereon. A gear 32 is secured on the shaft 21 to which power is transmitted for rotating the spotting wheel.

The first step in the process consists in grinding and finishing the concave sides of the lens blanks to the desired base curvature, say, six dioptrics. Then the blanks are secured accurately and uniformly on the spotting wheel so that their anterior sides will be ground by the grind stone 12, as the machine is operated.

The sphere or equatorial curvature will, in a general way, be predetermined by the diameter of the spotting wheel, but more accurately speaking, by the distance from the axis of the spotting wheel to the anterior or outer surfaces of the lenses. An increase in the radius of the spotting wheel will cause a corresponding decrease in the equatorial curvature, and the thicker the lenses secured upon a certain spotting wheel, the less will be said equatorial curvature.

In carrying out this process, by means herein illustrated, a single spotting wheel (or spotting wheels of the same diameter) is employed, but a plurality of grinding wheels or elements are used for making the series, the transverse concave curvature of the periphery of the grinding wheels or elements varying, that is, increasing in curvature. Thus, as shown in Figs. 2 and 3, the grind stone or element has a certain transverse curvature which will give a certain cylinder or meridional curvature to the lenses ground. In Fig. 4, a grinding element with a sharper transverse curvature is shown, cooperating with the same size of spotting wheel so that a stronger cylinder will be ground having a sharper meridional curvature. Other grinders are used having still sharper transverse curvatures until the whole series is completed.

In grinding sharper meridional curvatures, it is obvious that relatively thicker lenses are produced, or, in other words, thicker glass must be used in order to allow for the sharper meridional curvatures. The added thickness of the lenses for the sharper meridional curvatures or stronger cylinders, therefore, will have their anterior surfaces more remote from the axis of the spotting wheel than the lenses with slighter meridional curvatures, so that the equatorial curvatures or spheres will be reduced or weakened correspondingly. Hence, the lenses of the different series thus formed with such spotting wheel and series of grinders with varying transverse curvatures will differ from each other in their meridional curvatures, according to the transverse curvatures of the series of grinders and in their equatorial curvatures according to the differences in the thickness of the lenses or glass and, therefore, according to the differences in the meridional curvatures.

Such a series of toric lenses is illustrated in Fig. 7, there being four lenses shown in the series. The concave sides of all these lenses are of the same curvature. The equatorial curvatures of the different lenses in the series gradually decrease. The meridional curvatures in such series gradually increase. It is noted also that the differences in the equatorial curvatures of the lenses in said series are directly related to the differences in the thickness of the lenses and also to the differences in the meridional curvatures thereof.

In Fig. 7 the curvatures are shown exaggerated in order to illustrate the same. The first lens in the upper row illustrates the equatorial curvature and the one below it the meridional curvature of the same lens, and the same is true of the second, third and fourth lenses shown in the rows.

As stated, one series of lenses consists of all curvatures that can be made with one spotting wheel and a plurality or series of grinders with different transverse curvatures. The number in the series may be great or small, as desired, but a series with a considerable number of variations in the meridional curvature and corresponding equatorial curvatures must be ordinarily made and kept in stock by jobbers and opticians.

The automatic lessening of the equatorial curvatures by reason of the increase in thickness of the lenses, as a series is made, beginning with the grinding of a slight transverse curvature, and continuing with the grinding of gradually increasing transverse curvatures, causes the series as a whole to remain more nearly within the limits of theoretical perfection as to the form of said lenses whereby they have the combined virtues of all three kinds of toric lenses heretofore referred to, namely, the prevailing type of toric lens, the distance surface of the Ultex bifocal lenses, and the Punktal lenses, and has not the objections to said prior lenses. Furthermore, the lenses constituting this invention can be made by this process very rapidly, and practically as cheaply as the ordinary prevailing type of toric lenses, wherefore this invention constitutes an advance in the art of toric lenses and the manufacture thereof of considerable importance.

The chief characteristics of the toric lenses consisting of the series are three, namely, that they all have substantially the same lens power within commercial limits, and the same base curve on the concave side, and also their curvatures in one principal meridian on the convex sides vary according to the thickness of the lenses. The lens series with said characteristics results from the process set forth herein, and the chief novel features of the process consist of two steps or operations, namely, forming the concave sides of the series of lenses with a uniform base curve, and forming the convex surfaces so as to be toric with their curvatures in one principal meridian varying according to the thickness of the lenses. The first one of these two steps, namely, forming a uniform base curve, is not in itself new, having for a great many years been a characteristic in the manufacture of onepiece bifocal lenses made under the Conner patents and afterwards called "Ultex" lenses. The second step or operation in making this series of lenses is new and the total process, therefore, is new. The result which follows from the combination of these two steps or operations is giving to such series of lenses a uniform lens power.

The invention claimed is:—

1. A toric lens series of varying thickness having substantially the same power and having a constant base curve on the concave sides thereof and convex toric surfaces on the convex sides with their curvatures in one principal meridian varying according to the thickness of the lenses.

2. A toric lens series of varying thickness having substantially the same power and having a constant base curve on the concave sides thereof and the convex surfaces having a series of varying curvatures in one principal meridian with their curvatures in the other principal meridian varying according to the thickness of the lenses.

3. A toric lens series of varying thickness having substantially the same power and having a constant base curve on the concave sides thereof and the convex surfaces having a series of varying meridional curvatures with their equatorial curvatures varying according to the thickness of the lenses and according to said meridional curvatures.

4. The process of making a toric lens series, which process consists in first grinding and finishing the concave sides thereof with a constant curvature, mounting the same upon a spotting wheel of uniform diameter, and apply grinding elements of varying meridional curvatures to the exterior surfaces of the lenses for grinding the same, whereby the thickness and the meridional curvatures of said lenses will vary according to the transverse curvatures of the grinding element of varying meridional curvatures, and the equatorial curvatures will depend upon the radius of the spotting wheel and the thickness of the glass and whereby the lenses of the series will have substantially the same power.

5. A toric lens series of varying thickness, having substantially the same power and having a constant base curvature on the concave sides thereof, and toric surfaces on the convex sides with their curvatures in one principal meridian varying inversely with the thickness of the lenses.

In witness whereof, I have hereunto affixed my signature.

LUCIAN W. BUGBEE.